(12) United States Patent
Ogren et al.

(10) Patent No.: US 9,070,090 B2
(45) Date of Patent: Jun. 30, 2015

(54) SCALABLE STRING MATCHING AS A COMPONENT FOR UNSUPERVISED LEARNING IN SEMANTIC META-MODEL DEVELOPMENT

(75) Inventors: Philip Ogren, Boulder, CO (US); Luis Rivas, Denver, CO (US); Edward A. Green, Englewood, CO (US)

(73) Assignee: Oracle International Corporation, Redwood City, CA (US)

( * ) Notice: Subject to any disclaimer, the term of this patent is extended or adjusted under 35 U.S.C. 154(b) by 366 days.

(21) Appl. No.: 13/596,844

(22) Filed: Aug. 28, 2012

(65) Prior Publication Data

US 2014/0067728 A1    Mar. 6, 2014

(51) Int. Cl.
| | | |
|---|---|---|
| *G06F 15/18* | (2006.01) | |
| *G06N 99/00* | (2010.01) | |
| *G06K 9/62* | (2006.01) | |
| *G06F 17/22* | (2006.01) | |
| *G06F 17/30* | (2006.01) | |

(52) U.S. Cl.
    CPC ............ *G06N 99/005* (2013.01); *G06K 9/6256* (2013.01); *G06F 17/2264* (2013.01); *G06F 17/30569* (2013.01)

(58) Field of Classification Search
    None
    See application file for complete search history.

(56) References Cited

U.S. PATENT DOCUMENTS

| | | | |
|---|---|---|---|
| 7,536,634 B2 | 5/2009 | Green et al. | |
| 7,865,358 B2 | 1/2011 | Green et al. | |
| 7,912,907 B1 * | 3/2011 | Mantel et al. | 709/206 |
| 8,199,985 B2 | 6/2012 | Jakobsson et al. | |
| 8,396,859 B2 | 3/2013 | Green et al. | |
| 2007/0239679 A1 * | 10/2007 | Wieser et al. | 707/3 |
| 2009/0281732 A1 | 11/2009 | Turnbull | |
| 2010/0077011 A1 | 3/2010 | Green et al. | |
| 2010/0185689 A1 * | 7/2010 | Hu et al. | 707/803 |
| 2011/0093467 A1 | 4/2011 | Sharp et al. | |

(Continued)

FOREIGN PATENT DOCUMENTS

WO        9848360 A1    10/1998

OTHER PUBLICATIONS

"Integrating External Knowledge to Supplement Training Data in Semi-Supervised Learning for Text Categorization" Mohammed Benkhalifa et al Information Retrieval, 4, 91-113, 2001 c 2001 Kluwer Academic Publishers. Manufactured in the Netherlands.*

(Continued)

*Primary Examiner* — Kakali Chaki
*Assistant Examiner* — Luis Sitiriche
(74) *Attorney, Agent, or Firm* — Marsh Fischmann & Breyfogle LLP

(57) ABSTRACT

A string analysis tool for calculating a similarity metric between a source string and a plurality of target strings. The string analysis tool may include optimizations that may reduce the number of calculations to be carried out when calculating the similarity metric for large volumes of data. In this regard, the string analysis tool may represent strings as features. As such, analysis may be performed relative to features (e.g., of either the source string or plurality of target strings) such that features from the strings may be eliminated from consideration when identifying target strings for which a similarity metric is to be calculated. The elimination of features may be based on a minimum similarity metric threshold, wherein features that are incapable of contributing to a similarity metric above the minimum similarity metric threshold are eliminated from consideration.

23 Claims, 5 Drawing Sheets

(56) References Cited

U.S. PATENT DOCUMENTS

2011/0106836 A1* 5/2011 Hassanzadeh et al. ....... 707/769
2012/0078919 A1* 3/2012 Mineno ......................... 707/748

OTHER PUBLICATIONS

"Duplicate Record Detection: A Survey" Ahmed K. Elmagarmid et al IEEE Transactions on Knowledge and Data Engineering, vol. 19, No. 1, Jan. 2007.*

Chen, Li et al., "Efficient Merging and Filtering Algorithms for Approximate String Searches", Data Engineering, 2008. ICDE 2008. IEEE 24th International Conference on, IEEE, Piscataway, NJ, USA, Apr. 7, 2008, pp. 257-266, XPO31245983, ISBN: 978-1-4244-1836-7.

Naoaki Okazaki et al., "Simple and Efficient Algorithm for Approximate Dictionary Matching", Proceedings of the 23rd International Conference on Computational Linguistics, Aug. 2010, pp. 851-859, XP055094147, Retrieved from the Internet: URL:http://www.aclweb.org/anthology/C10-1096.pdf.

Miller Ethan et al., "Performance and Scalability of a Large-Scale N-gram Based Information Retrieval System", Internet Citation, 2000, XP007903178, Retrieved from the Internet: URL:http//citeseer.ist.psu.edu/cache/papers/cs/15866/http:zSzzSzwww.cse.ucsc.eduzSz~elmzSzPaperszSztelltale.JODI.pdf/miller00performance.pdf.

Notification of Transmittal of the International Search Report and the Written Opinion of the International Searching Authority, or the Declaration, Mailing Date Jan. 7, 2014, pp. 1-13.

Lin, Dekang, "An Information-Theoretic Definition of Similarity", Dept. of Computer Science, Univeristy of Manitoba, 9 pages.

* cited by examiner

ACME Brand 9 Volt Batteries, 2/PK
ACME Brand 9 Volt Batteries, 4/Pack
ACME Brand AA Batteries, 12/Pack
ACME Brand AA Batteries, 16/Pack
ACME Brand AA Batteries, 2/Pack
ACME Brand AA Batteries, 4/PK
ACME AA Batteries, 8/Pack
ACME Brand AA Batteries, 96/Carton
ACME Brand AAA Batteries, 12/Pack
ACME AAA Batteries, 16/Pack
ACME Brand AAA Batteries, 2/Pack
ACME Brand AAA Batteries, 4/Pack
ACME Brand AAA Batteries, 48/CRT
ACME Brand AAA Batteries, 8/Pack
ACME Brand C Batteries, 4/Pack
ACME Brand C Batteries, 8/Pack
ACME Brand D Batteries, 4/PK
ACME D Batteries, 72/Carton
ACME Brand D Batteries, 8/PCK
ACME Brand ULTRA-VOLT AA Batteries, 4/Pack
ACME Brand ULTRA-VOLT AAA Batteries, 4/Pack
ACME Brand Ultravolt Batteries, D, 1
ACME Brand Ultra 9 V Batteries, 2/Pack
ACME Brand Ultra AA Batteries, 4/Carton
ACME Brand Ultra AA Batteries, 8/Pack
ACME Ultra AAA Batteries, 4/PCK
ACME Ultra AAA Batteries, 8/Pack
ACME Brand Ultra AAAA Batteries, 2/Pack
ACME Brand Ultra C Batteries, 4/Pack
ACME Brand Ultra D Batteries, 4/Pack

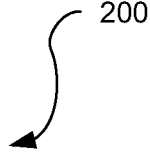

FIG. 4

SCALABLE STRING MATCHING AS A COMPONENT FOR UNSUPERVISED LEARNING IN SEMANTIC META-MODEL DEVELOPMENT

FIELD

The present disclosure is generally related to computer-based tools for analysis of strings to provide a quantitative similarity metric between a source string and a target string, and in particular is related to computer-based tools that include optimizations to speed the execution of string analysis at run-time.

BACKGROUND

String matching, or the degree of overlap between two strings, is an important component for many data quality processes. In a simple example, two strings may differ in ways such as the perturbation of a single character. For instance, in the strings "Mississippi" and "Mississippe" differ with respect to a single character. However, differences between related strings may be much more complicated. Consider the following examples of source and target strings in the context of matching the source text to the target text.

| Source string | Target strings |
| --- | --- |
| 10 ohm 5% ¼ watt res | RES, CF ¼ WATT, 5% 10 OHM |
| | RES, CF ¼ WATT, 5% 100 OHM |
| | RESISTOR 5% ¼ WATT 10 OHM | or,

| Source string | Target strings |
| --- | --- |
| Chevrolet Division, General Motors | GM, Chevrolet Div |
| | General Motors, Chevy Div |

In these examples, simple string matching techniques may suggest that the source and target text strings are very different despite the fact that the meaning of the strings is the same. The challenge previously faced is how to determine that these strings refer to the same things, and further, how to scale this solution to very large data sets.

Examples of prior approaches proposed for performing string matching analysis may include deterministic matching and fuzzy matching. Deterministic matching involves a cascading sequence of match scenarios where when a match occurs, the sequence stops. Fuzzy matching algorithms attempt to match two strings typically through the use of a cost or distance function that is minimized. Each of these approaches has disadvantages. Thus there is a continued need for string matching analysis approaches.

SUMMARY

In view of the foregoing, embodiments describe a string analysis tool that may perform analysis of strings to develop a similarity metric indicative of the commonality between a source string and one or more target strings. Some embodiments of the string analysis tool may leverage advantages provided with both deterministic matching and fuzzy matching approaches to provide a rapid, domain independent process for analysis of strings.

Generally, one embodiment of the string analysis tool is operable to represent strings as features. The features of a source string may be compared to features of a target string to calculate the similarity metric between the source string and the target string. However, for very large target string corpuses, the calculation of a similarly metric for each target string in the corpus may require a large amount of computational resources such that the analysis may be cost and time prohibitive.

In this regard, one embodiment of the string analysis tool described herein may employ an optimization module that may reduce the number of similarity metrics that are calculated such that similarity metrics are only calculated for a portion of the target strings. The identification of target strings for which a similarity value to be calculated may be based on a predetermined minimum similarity metric threshold. Utilizing the minimum similarity metric threshold, this embodiment of the tool may identify features (e.g., of the source string and/or target string) that may be eliminated from consideration in the string analysis. For example, features may be eliminated from consideration based on a determination that the features to be eliminated cannot possibly return a similarity metric above the minimum similarity metric threshold.

In at least one embodiment presented in this disclosure, features of the target strings may be eliminated from consideration even before receipt of the source string. As such, at least some pre-computation may occur prior to receipt of the source string. Furthermore, features from the source string may be eliminated from consideration based on known parameters of the source features in the target strings. In this regard, an index may be compiled (e.g., precompiled prior to receipt of a source string) that includes information related to the distribution or frequency of features in the target strings. In an implementation, the index may be a inverted index that includes a mapping between each feature and target strings in which feature occurs. As such, the index may be employed to provide information related to features identified from the strings.

Accordingly, a first aspect presented herein includes a method of string analysis using a computer-based comparison tool. The method includes identifying, using the computer-based comparison tool, a plurality of target strings. The method further includes representing each of the plurality of target strings as one or more target features. The method also includes compiling, using the computer-based comparison tool, an index corresponding to the target features. As stated above, the index may include a mapping for each target feature to each of the plurality of target strings containing the target feature.

The method of the first aspect may also include receiving, using the computer-based comparison tool, a source string and representing the source string as a plurality of source features. The method further includes determining a portion of the target strings for which a similarity metric is to be calculated. The portion of the target strings may include less than the entirety of the target strings. The method also includes calculating, using the computer-based comparison tool, a similarity metric for the source string relative to the portion of the plurality of target strings. The similarity metric may be at least partially based on commonality between the target features and the source features.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in an embodiment, the portion of the plurality of target strings for which a similarity metric is calculated may at least comprise one target feature in common with at least one source feature. In an implementation, the method may also include assigning a feature weight to each feature. The feature weight of the feature may correspond to a measure of the contribution of the feature to the similarity metric. As such, source features may be assigned a source feature weight and the target features may be assigned a target feature weight. In an embodiment, the source feature weight may be different than the target feature weight. The feature weight may be at least partially based on a frequency of the feature in the plurality of target strings, wherein a feature having a frequency above an upper threshold or a frequency below a lower threshold is given a reduced frequency weight.

In an embodiment, the method may include establishing a minimum similarity metric between the source string and the target strings and eliminating source features from consideration in the determining operation at least partially based on the minimum similarity metric. In this regard, the eliminating operation may include determining a portion of the source features that must be employed in the calculating such that only target strings having common target features to the portion of the source features are capable of exceeding the minimum similarity metric and are included in the portion of target strings for which a similarity metric is calculated.

In an embodiment, the method may include establishing a minimum similarity metric between the source string and the target strings and removing at least one mapping from the index at least partially based on the minimum similarity metric. In this regard, the removing operation may include determining a portion of the target features that can be removed from the index such that only target features are included in the index that correspond with target strings capable of exceeding the minimum similarity metric.

In an application, the method may further include generating string similarity output data at least partially based on the similarity metric. The string similarity output data may include matching ones of the portion of the plurality of target strings, wherein the matching ones correspond to a similarity metric above a predetermined threshold with respect to the source string. In an embodiment, the string similarity output data may include a matched target string from the plurality of target strings based on the matched string having the highest similarity metric relative to the source string. In an implementation, the output data may include at least one cluster of strings. The cluster of strings may include a plurality of target strings identified as exceeding a threshold similarity metric with respect to each other. In any regard, the string similarity output may be provided to an unsupervised learning environment. The unsupervised learning environment may, in turn, employ the string similarity output in an automated machine learning process.

A second aspect presented herein includes an apparatus for use in string analysis. The apparatus includes a feature module, executable by a computer-based string analysis tool, which is operable to represent each of a plurality of target strings as a plurality of features. The apparatus also includes an indexing module, executable by a computer-based string analysis tool that is operable to compile an index comprising a mapping. The mapping may correlate each target feature to each one of the plurality of target strings containing the target feature. The apparatus also includes a similarity metric module, executable by a computer-based string analysis tool that is operable to calculate a similarity metric between a source string and each of a selected portion of the plurality of target strings having at least one common feature to the source string. The similarity metric may be a quantitative value regarding the commonality of features between the source string and each of the selected portion of the plurality of target strings. The apparatus further includes an optimization module, executable by a computer-based string analysis tool that is operable to determine the selected portion of the plurality of target strings for which a similarity metric is calculated based at least partially on elimination of features from consideration based on a minimum similarity metric threshold.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In an embodiment, the apparatus may include a feature weighting module, executable by a computer-based string analysis tool that is operable to attribute a weight to a feature for use in calculating the similarity metric.

In an implementation, the optimization module may be operable to eliminate features from consideration such that the selected portion of the plurality of target strings only include target strings having a similarity value relative to the source string above the minimum similarity metric threshold. The eliminated features may include at least one source feature and at least one target feature.

In application, the apparatus may include an unsupervised machine learning tool in operative communication with the apparatus for use in string analysis, wherein the unsupervised machine learning tool is operable to utilize the apparatus in performing at least one unsupervised machine learning operation. The unsupervised machine learning tool is operable to utilize the apparatus for at least one of generating an string similarity output receivable by the unsupervised machine learning tool or access the apparatus during the at least one unsupervised machine learning operation.

A third aspect presented herein includes a non-transitive storage medium for storing instructions for execution by a processor of a computer-based string analysis tool. The instructions, when executed by the processor, cause the processor to identify a plurality of target strings, represent each of the plurality of target strings as one or more target features, and compile an index corresponding to the target features. The index may include a mapping for each target feature to each of the plurality of target strings containing the target feature. The instructions may also cause the processor to receive a source string and represent the source string as a plurality of source features. The instructions further may cause the processor to determine a portion of the target strings for which a similarity metric is to be calculated. The portion of the target strings may be less than the entirety of the target strings. The instructions may also cause the processor to calculate, using the computer-based comparison tool, a similarity metric for the source string relative to the portion of the plurality of target strings. The similarity metric may at least partially be based on commonality between the target features and the source features.

BRIEF DESCRIPTION OF THE DRAWINGS

FIG. 4 depicts an embodiment of a string cluster that may be derived from a string analysis tool.

DETAILED DESCRIPTION

Figure 1:
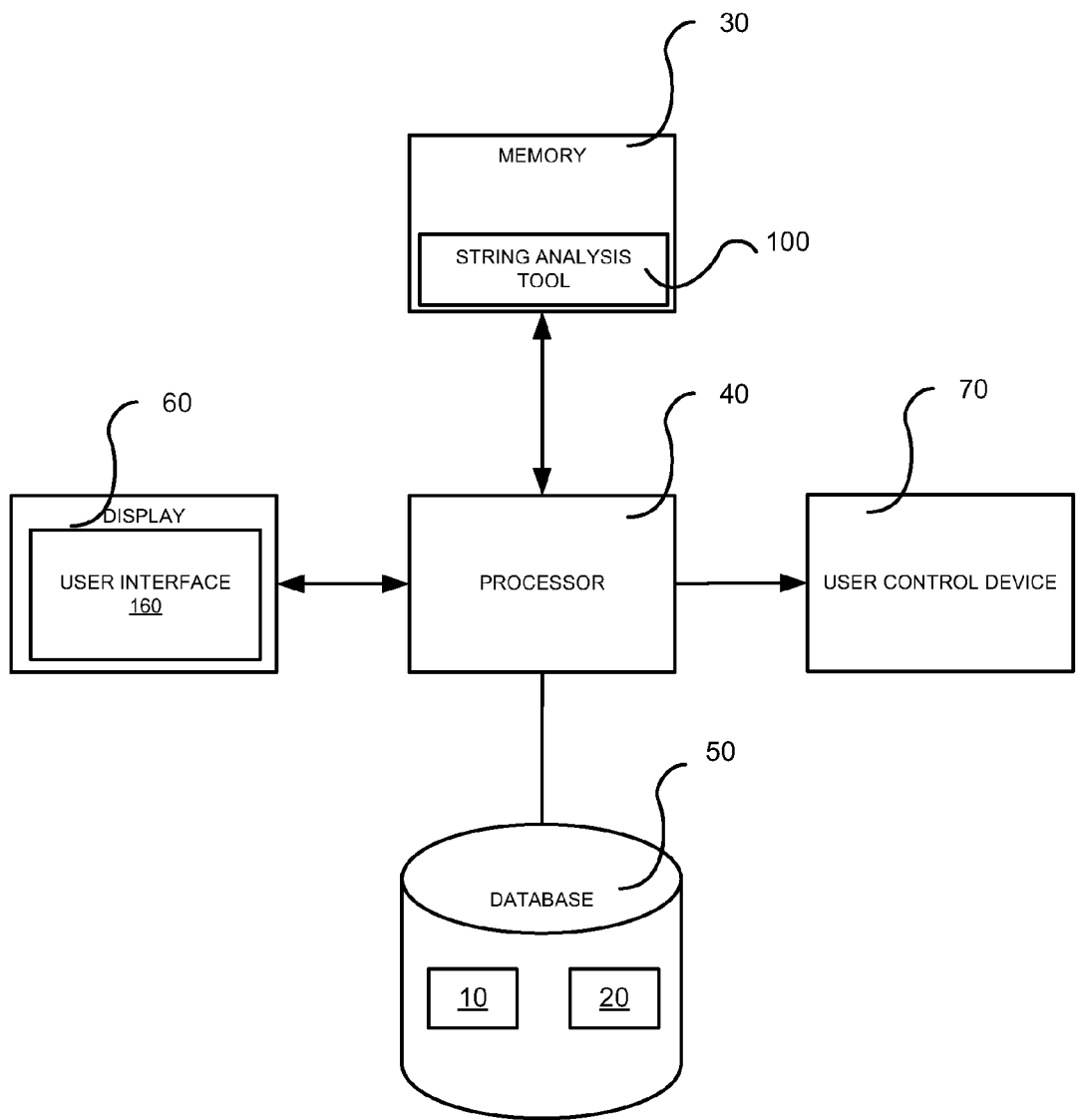
FIG. 1 depicts a schematic view of an embodiment of hardware associated with an embodiment of a string analysis tool.

The present disclosure generally relates to string analysis and implementations of string analysis in unsupervised machine learning environments. Embodiments of a tool for string analysis are described that provides techniques and optimizations that allow for fast implementation (e.g., at run-time). As such, even for extremely large data sets, string analysis may be performed efficiently at run-time such that the computational resources needed to perform the string analysis are minimized and the analysis occurs rapidly at run-time. Accordingly, a quantitative similarity metric may be provided that is indicative of the similarity between source and target strings. Such a quantitative similarity metric may be used in a variety of ways that may be leveraged in an unsupervised machine learning environment. For example, the analysis resulting in a similarity metric between a source and target strings may allow for matching, searching, and/or clustering of strings as tools to assist in a machine learning environment.

In this regard, in an embodiment, a computer-based string analysis tool may be provided for performing analysis of a plurality of strings. In various embodiments, the strings may correspond to different types of data. For example, the strings may comprise text, numbers, signals, or other data. In an embodiment, the strings may correspond with text such as in the context of data quality applications. For example, the strings may correspond to product information (e.g., product information contained in legacy databases maintained by businesses). In other embodiments, the strings may represent or correspond to a plurality of other data sources and/or contexts such as documents, web pages, biological sequencing (e.g., DNA sequencing), random data sets, scientific data, or any other context where determining similarity between two strings may be beneficial.

Generally, the string analysis performed by embodiments of the string analysis tool described herein may be used to determine the similarity (e.g., a quantitative similarity metric) between a source string and target string. For example, a source string and target string that are completely identical may have a similarity metric of 100%, while a source string and target string that are completely dissimilar may have a similarity metric of 0%. As will be appreciated in the discussion below, the string analysis described herein may be used to enable search functionality, matching functionality, clustering functionality, or other data analysis based on the quantitative similarity metric between a source string and one or more target strings. As a result, a string similarity output may be generated that may be provided to an unsupervised learning environment such that the unsupervised learning environment may employ the string analysis tool in performing machine learning techniques or machine learning techniques may be applied to the string similarity output as will be described in greater detail below.

With reference to FIG. 1, an embodiment of hardware is shown that may be used to execute an embodiment of a string analysis tool 100 described herein. In this regard, a processor 40 may be provided that is in operative communication with a memory 30. The memory 30 may store one or more modules comprising the string analysis tool 100 as will be described in greater detail below. In this regard, the string analysis tool 100 and/or the modules comprising the string analysis tool 100 may be stored as non-transitive computer readable instructions in the memory 30. The non-transitive computer readable instructions may be accessible by the processor 40 and capable of instructing a processor 40 to perform functionality associated with each module comprising the string analysis tool 100 as described below.

The processor 40 may also be in operative communication with a display 60. Further still, the processor 40 may be in operative communication with a user control device 70. In this regard, the processor 40 may be operable to execute a user interface 160 including a display portion displayed on the display 60. Furthermore, the user control device 70 may be operative to receive user inputs in connection with the user interface 160. As such, the user interface 160 may, at least in part, allow a user to interact or control the string analysis tool 100.

The processor 40 may also be in operative communication with a database 50. The database 50 may be operative to store, for example, source content 10 and/or target content 20 for use in a string analysis as will be described in further detail below. In addition, the database 50 may store additional data including, for example, information regarding strings and/or features, probability data regarding strings and/or features, weighting parameters regarding strings and/or features, or other data that may be employed in the string analysis. Further still, the database 50 may include data regarding unsupervised machine learning tools, for example, for when the string analysis tool 100 is used in conjunction with an unsupervised learning environment as will be described in greater detail below.

Figure 2:
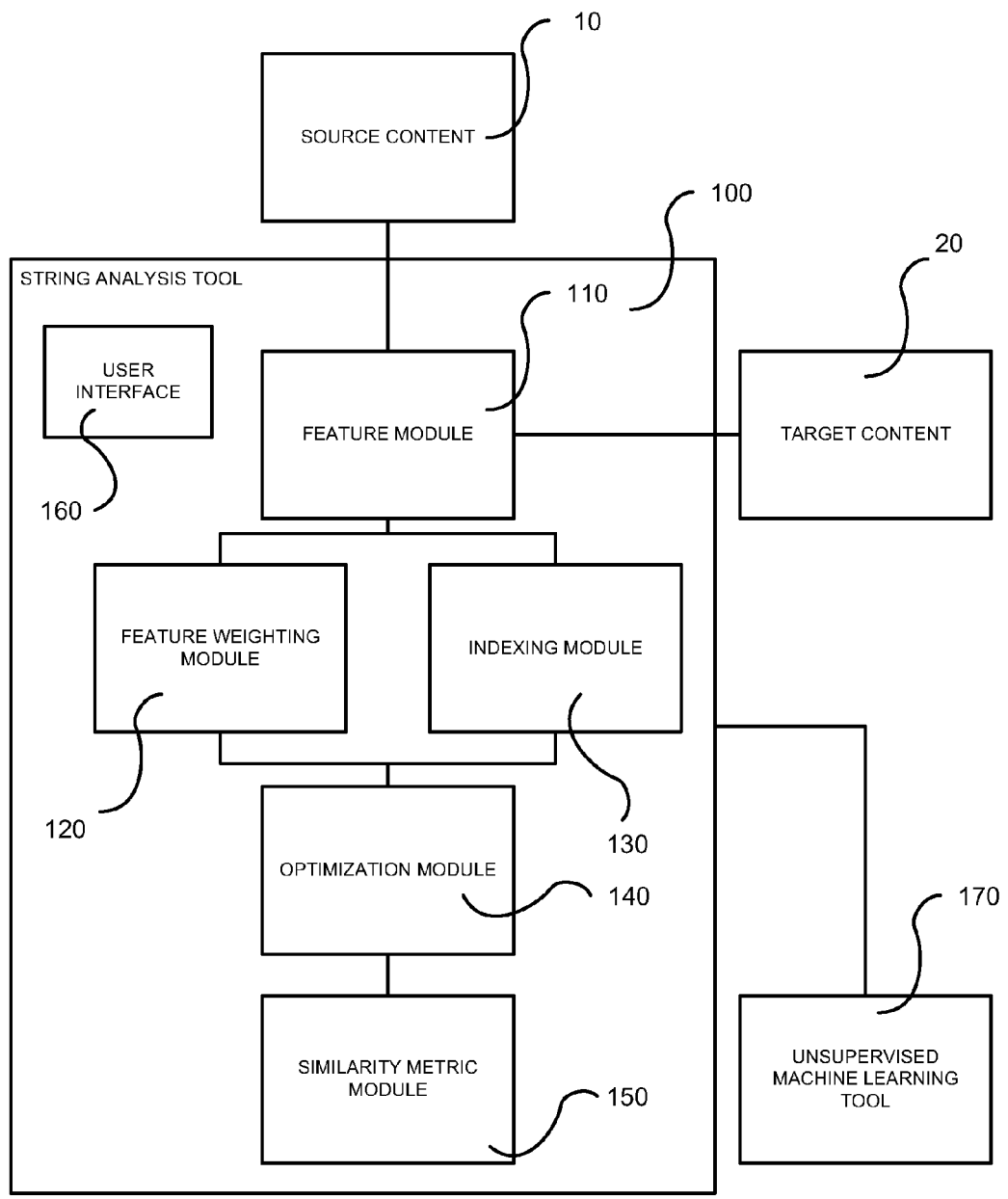
FIG. 2 depicts a schematic of an embodiment of a string analysis tool.

With reference to FIG. 2, an embodiment of the string analysis tool 100 is depicted. The string analysis tool may comprise one or more components that may function to perform one or more different aspects of the string matching analysis described herein. As may be appreciated, the components described herein may correspond to one or more hardware or software modules capable of performing functions as described below. It may also be appreciated that while addressed separately for clarity, one or more components may be consolidated into a single component. Furthermore, additional distinct modules may be provided in addition to those described below.

Returning to FIG. 2, the string analysis tool 100 embodiment may generally include four components. The components of the string analysis tool 100 embodiment may comprise a feature module 110, a feature weighting module 120, an indexing module 130, and an optimization module 140. The following description will contain a description of each module. Thereafter an exemplary analysis process is described. In turn, some non-limiting examples of specific contexts in which the string analysis tool embodiment may be employed or applied will then be described.

The feature module 110 may be operable to represent source or target strings as features. A feature may be any characteristic of the string that can be derived from the string or the data record from which the string is drawn. In this regard, a feature may leverage metadata associated with a string. The feature module 110 may be operable to access source content 10 or target content 20. The source content 10 may include or be operable to receive a source string for analysis. In this regard, the source content 10 may be, in one embodiment, a query interface capable of receiving a query from a user. In another embodiment, the source content 10 may be a portion of the target content 20. For example, as will be described in detail below, a given target string from the target content 20 may serve as a source string in the analysis.

With respect to the source content 10 and/or target content 20, as described above, the source content 10 and/or target content 20 may include strings representing a variety of different data types and/or data sources. In one embodiment, the source content 10 and/or target content 20 may include textual data. For example, the textual data may be representative of business data such as, for example, product descriptions, electronic catalogs, stock keeping data, accounting data, marketing data, or other textual information relating to the business.

In one embodiment, the feature module 110 may be operable to represent strings as character n-grams, where each character n-gram corresponds to a feature. Character n-grams are fixed-width sequences of contiguous characters. Character n-grams may be easy to compute, domain independent, and particularly suited to the context of text matching.

For example, one example of an n-gram that may be used to generate features is a trigram. A trigram has a fixed-width sequence of three characters. Thus, a string may be represented by a plurality of features corresponding to successive three character sequences of the string. For example, consider the string "RES 10 OHM ¼ WATT 5%." The string may be represented by a plurality of trigrams as follows: <B>re, res, es<E>, <B>10, 10<E>, <B>oh, ohm, hm<E>, <B>1/, ¼, /4<E>, <B>wa, wat, att, tt<E>, <B>5%, 5%<E>, where <B> indicates a leading space and <E> indicates at trialing space in the feature. As may be appreciated, the representation of the string as an n-gram may be domain independent such the feature generation may be applied without deference to the source or form of the data. As such, it may be appreciated that feature generation may be applied to a variety of domains quite easily. The flexible architecture, however, also allows for fine-tuned customization for a given domain or data set.

In an embodiment, the feature module 110 may be operable to represent a string as one or more features based on a word-level token found in a string. For example, the generation of features may leverage domain-specific knowledge. One example may be utilizing knowledge of how product part numbers or telephone numbers are constructed. In this regard, a listing of ten digit telephone numbers may utilize a known rule that the first three digits represent the area code for the number. Thus, the first three digits of each number may be used to generate a feature corresponding to the area code. The remainder of the number may be processed utilizing, for example, a different feature representation, such as an n-gram or other feature with the understanding those numbers may be random or lack the underlying meaning attributed to the area code. Additionally or alternatively, linguistic knowledge, taxonomy, grammatical, syntax, or other schema data may be used to generate features. Accordingly, features may reflect heuristics for common abbreviation strategies, textual structure features, or other linguistic knowledge may be used to represent strings as features.

The string analysis tool embodiment 100 may also include a feature weighting module 120. The feature weighting module 120 may be in operative communication with the feature module 110. As such, the feature weighting module 120 may be operable to receive the features generated by the feature module 110 based on the source content 10 and/or target content 20. The feature weighting module 120 may be operable to provide each feature a weight that is used to determine how much a feature contributes (or does not contribute) to the string analysis. Examples of feature weighting may include, but are not limited to, giving each feature a score of 1.0 such that each feature contributes equally in the analysis, using frequency information regarding the feature from the source content 10 and/or target content 20 to weight the feature (e.g., using the negative log of the probability), or using the frequency rank of the feature. One particular example of a weighting technique may include using a beta distribution over the frequency rank. In this context, high frequency features are given very little weight as the high frequency features tend to be uninformative. Very low frequency features may also be given very little weight because they tend to be noisy. As a result, a feature having a frequency below an upper threshold and above a lower threshold may be given a relatively large weight as those features may be informative and less prone to noise that high and low frequency features, respectively.

For example, when the target strings include documents (e.g., news articles, scholarly papers, or other plain language documents), a trigram feature "the" may have a very high frequency in the target strings. That is, the term "the" may appear very often in the documents. However, the appearance of the term "the" may be very uninformative regarding the similarity of a source string containing the feature "the" and a target string containing the feature "the" due to the high frequency in the target documents. On the other hand, a feature "<B>z<E>" may have a very low frequency in the target documents. However, the existence of the feature "<B>z<E>" in the target documents may be subject to noise such that the appearance of the feature in the target documents may also be uninformative as to the similarity of a source string containing the feature "<B>z<E>" and a target string containing the feature "<B>z<E>". Thus, both features "the" and "<B>z<E>" may be given relatively low weights in the string analysis performed by the tool.

The tool embodiment 100 may also include an indexing module 130. The indexing module 130 may be in operative communication with the feature module 110 so as to receive the representations of source strings and/or target strings as features per the operation of the feature module 110 as described above. The indexing module 130 may be operable to calculate an index for each feature of a string or collection of strings. For example, an inverted index relating features to a plurality of strings may be created such that a mapping from each feature to every string that contains that feature is established. In this regard, the index may provide information regarding the relationship between a feature and one or more strings containing that feature (e.g., include a mapping between features and every string in a plurality of target strings including a given feature).

The tool embodiment 100 may also include a similarity metric module 140. The similarity metric module 140 may be operable to calculate a quantitative similarity metric that describes the similarity between a source string and a target string. As discussed above, the similarity metric may be an intuitive similarity score between a source string and a target string that ranges between 0% and 100%. In this regard, a perfect overlap of the source string and target string may result in a similarity metric of 100%, whereas no overlap between the source string and the target string may result in a similarity metric of 0%. In other embodiments, there may be other fuzzy metrics used, such as a range 0 to 1, etc. Calculating the similarity metric for a given source string and the target string may include calculating a similarity metric based on commonality of features between the source string and target string using the feature representation described above with respect to the feature module 110 for each string pair that is to be compared. In this regard, the similarity score may be computed by observing features that are shared between the source and target strings and/or by observing features that are present in one of the source or target strings, but that are not shared. Any one or more of a plurality of different similarity metrics known in the art may be employed. Examples include, but are not limited to, weighted average as a ratio of feature weights in common over all features, the Jaccard similarity index, a Bayesian approach that computes the probability of having features in common, etc. Further examples of potential similarity metrics that may be employed are discussed in Dekang Lin, *An Information-Theoretic Definition of Similarity*, ICML '98 Proceedings of the Fifteenth International Conference on Machine Learning, Morgan Kaufmann Publishers Inc., San Francisco, 296-304 (1998), which is incorporated herein by reference in its entirety.

The tool 100 embodiment may also include an optimization module 150. As depicted, the optimization module 150 may be in operative communication with the feature weighting module 120 and the indexing module 130. The optimization module 150 may be disposed between the similarity metric module 140 and the feature weighting module 150/indexing module 130. As such, the optimization module may be operable to perform a number of optimizations relative to the features of the source string and/or target strings undergoing analysis. The optimizations performed by the optimization module 150 may reduce the computational resources required to compute similarity metrics between a source string and a plurality of target strings. For example, in traditional string analysis, when determining a similarity metric between a source string and a target string, the process would involve calculating for each source string/target string pair a similarity metric. For very large target string corpuses, this required the use of very large computational resources to accomplish. Furthermore, many of the similarity metrics calculated for source string/target string pairs may be frivolous as the similarity metric for many source string/target string pairs may be uninformative or near zero.

However the optimization module 150 may provide a more efficient process for determining similarity metrics by reducing the number of similarity metrics that must be calculated for any given analysis between a source string and a plurality of target strings. In this regard, the optimization module 150 may be operable to eliminate source features from consideration, eliminate of target strings from consideration, or may include removal of feature to string mappings from the index. It may be appreciated from the following discussion that any or all of these approaches may reduce the processing overhead expended by the similarity metric module 140 associated with the generation of similarity metrics between a source string and a corpus of target strings.

For instance, a first optimization performed by the optimization module 150 may be related to eliminating target strings from consideration in the similarity metric calculation that have no similarity with the source string. That is, the optimization module 150 may employ the index compiled by the indexing module 130 to determine which of the target strings include at least one common feature with the source string. As such, only target strings having at least one feature in common with the source string may remain for consideration.

Additionally, the first optimization technique performed by the optimization module 150 may be extended by leveraging an important characteristic of the distribution of features common to many collections of strings. For example, features may generally follow a Zipfian distribution in which a few features occur very often and many features occur infrequently. Thus, the features for a target string will contain some features that are very frequently and others that are very infrequent. Stated differently, some features of the source string may retrieve many candidate target strings while other features may retrieve very few candidate target strings.

The optimization module 150 may utilize the known frequency distribution obtained from the index such that target string candidate look up for high frequency features may be eliminated by establishing a minimum similarity metric threshold. In turn, the number of features from the source string that must be queried in order to guarantee that there will be no target strings missed that have a similarity metric above the minimum similarity metric threshold may be calculated. Accordingly, once this calculated value related to the number of features needed to be queried to only return target strings having a similarity metric above the minimum similarity metric threshold is known, it may be used to eliminate the most frequent features of the source string from consideration such that the number of target string candidates may be greatly reduced. That is, given a reduction in the number of source features, a decrease in the number of target strings that may be returned having at least one source feature may also occur. While an exemplary approach to this optimization technique may be described in detail below, it will be understood that this approach may be applied to a wide variety of different kinds of features, feature weighing schemes, and similarity metrics that may be employed as alternatives to the specific techniques outlined below.

One exemplary application of a technique to reduce the number of source features is described below. The technique generally begins with:

$$sim(t_1, t_2) = \frac{2 * I(common(t_1, t_2))}{I(F(t_1)) + I(F(t_2))} \quad \text{Equation 1}$$

Where $t_1$ represents a source string and $t_2$ represents a target string, common($t_1$, $t_2$) is a function that returns the features that are common to both $t_1$ and $t_2$, and $F(t_1)$ is a function that returns the features of $t_1$. Also, in Equation 1, the value I(F(t)) may be express as:

$$I(F(t)) = \Sigma_{f \in F(t)} -\log_2 P(f) \quad \text{Equation 2}$$

P(f) is simply the probability of a feature which can be calculated by dividing the number of times a feature appears in the target strings by the total number of times all features have been seen.

Equation 1 above may be rewritten to include weighting parameters relative to the source features or target features. As such, Equation 3 may be derived:

$$sim(t_1, t_2) = \frac{2 * I(common(t_1, t_2))}{w_1 * I(F(t_1)) + w_2 * I(F(t_2))} \quad \text{Equation 3}$$

Where $w_1$ and $w_2$ are weighting parameters. The weighting parameters may be modified so that the values behave as a weighted average such that $w_1$ and $w_2$ sum to 1. As a result, substituting the concept of a weighted average for the weighting parameters, Equation 4 may be derived:

$$sim(t_1, t_2) = \frac{2 * I(common(t_1, t_2))}{w * I(F(t_1)) + (1 - w) * I(F(t_2))} \quad \text{Equation 4}$$

In turn, the optimization technique described above where source features are removed from consideration may be employed with respect to Equation 4. As an initial step, Equation 4 may be rewritten as an inequality:

$$y < \frac{c}{w*A + (1-w)*B} \quad \text{Equation 5}$$

Where $y=\text{sim}(t_1,t_2)$, $C=I(\text{common}(t_1,t_2))$, $A=I(F(t_1))$, and $B=I(F(t_2))$. In this regard, rather than calculating Equation 4 for each source string/target string pair, Equation 5 may be used to determine which source features may be eliminated based on a minimum similarity metric threshold y. It may be known that the term w*A will not change for each source string/target string pair because w*A is dependent only on the source string. While the value of B cannot be calculated because it may be different for every source string/target string pair, the minimum value of the following ratio may be calculate in order to guarantee that Equation 5 maintains validity.

$$x = \frac{c}{w*A} \quad \text{Equation 6}$$

Equation 6 represents a value x, where it is determined how small x can be given B may be different for each source string/target string pair. If the minimum value of x can be determined, then the minimum value of C ($I(\text{common}(t_1,t_2))$) may be determined because A can be calculated for the source text alone. If the minimum value of C is known, then source features having values of C below the minimum value may be eliminated from consideration in the candidate lookup step described above where only target string sharing features common to source features remain for consideration. That is, only features may be looked up using the index that remain for consideration after the optimization. Therefore, x will be solved for in terms of y.

In order to accomplish this, the worst possible value (i.e. when B maximally constrains the ability to remove features from consideration) is considered. This happens to be when B=C. This means that B will contribute the maximum it can to the similarity score. Using this substitution and substituting A with its value given in Equation Error! Reference source not found, 5 (solving for A) Equation 4 becomes Equation 7:

$$y < \frac{c}{\frac{c}{x} + (1-w)*c} \quad \text{Equation 7}$$

Solving for x results in Equation 8:

$$x > \frac{y}{1 - y(1-w)} \quad \text{Equation 8}$$

Equation 8 is used for determining minimum required value of C in order for y to have any chance of being greater than the provided minimum similarity metric threshold. Given this minimum value of C, source features that do not need to be considered when determining candidate target strings from the index may be eliminated by considering only target strings having at least one common feature left for consideration.

One potential strategy is to sort the source features in order of descending frequency. A sum of the information of the source features in order may be calculated such that the sum does not exceed C. The remaining (and more informative) features are then used to gather candidate target strings from the corpus such that a similarity metric is only calculated between the source string and each of these candidate target strings determined from the index that share a feature with the remaining source features.

One example of the foregoing optimization technique may be applied for a corpus of target strings that have the following features whose respective information calculations are:

| Feature | P(F)    | I(F)  |
|---------|---------|-------|
| F1      | 0.00001 | 16.61 |
| F2      | 0.0001  | 13.29 |
| F3      | 0.001   | 9.97  |
| F4      | 0.01    | 6.64  |
| F5      | 0.1     | 3.32  |

Now, suppose a source string ($t_1$) has the following features $F(t_1)=\{F1, F3, \text{and } F5\}$ and one of the target strings has the following features $F(t_2)=\{F5\}$. The similarity of $t_1$ and $t_2$ is (assuming w=0.5):

$$\text{sim}(t_1, t_2) = \frac{3.32}{0.5*29.9 + 0.5*3.32} = 0.20$$

Assume another target string, $t_3$, which has the following features $F(t_3)=\{F1, F3, F4\}$. The similarity of $t_1$ and $t_3$ is:

$$\text{sim}(t_1, t_3) = \frac{26.58}{0.5*29.9 + 0.5*33.22} = 0.84$$

Given the high probability of the similarity between t1 and every target string that contains F5 (e.g., as much as 10% of the corpus if F5 never occurs twice in the same target text) may be required to be calculated. As may be appreciated, this represents a very high utilization of computational resources that may return only very small, uninformative similarity metrics. In contrast F3 and F5 may require calculating the similarity on 0.1% and 0.001% of the corpus, respectively. Thus using F5 to gather up similar candidates is both expensive and rather pointless (contrast the 20% similarity with the 84% similarity). So, a minimum score threshold of y=0.5 may be established to remove from consideration the source feature F5). The calculation of x from Equation 8 becomes:

$$x > \frac{0.5}{1 - 0.5(1 - 0.5)} = 0.667$$

The value for $A=I(F(t_1))$ may also be calculated as:

$$A=I(F(t_1))=29.9$$

The value for $C=I(\text{common}(t_1,t_2))$ may then be calculated:

$$C=w*A*x=0.5*29.9*0.667=9.967$$

Again, C represents the minimum amount of information that must be shared by the source string and the target string in order for the minimum similarity metric threshold to be reached. Again, this is for the worst case scenario where C and B are the same. We can now apply this value of C to the source string and eliminate features to use for gathering candidate target stings by referencing the index. We can eliminate F5 (the most frequent feature of t1) because its information (value of C), 3.32, is less than 9.967. We cannot also eliminate F3 (the next most frequent feature of t1) because the sum of F5 and F3 is 13.29 which is greater than C. Therefore, we will gather all texts that have features F1 and F3 and calculate their similarity with T1. This represents approximately a 100 fold decrease in the number of candidates that must be considered because F5 is 100 times more common than F3.

Note that the information of F3 is slightly greater than C. So, the worst case scenario for a B that contains F3 would be $t_4$ such that $F(t_4)=\{F3\}$. Assuming the foregoing calculations to be valid, the similarity between $t_1$ and $t_4$ should be greater than the predetermined minimum similarity metric threshold of 0.5. Calculating the similarity metric between $t_1$ and $t_4$ results in:

$$sim(t_1, t_4) = \frac{9.97}{0.5*29.9 + 0.5*9.97} = 0.50013$$

As can be appreciated, the similarity metric between $t_1$ and $t_4$ is greater than the predetermined minimum similarity metric threshold of 0.5, which demonstrates that the elimination of source features from consideration results in target strings being retrieved from the index that can only return a similarity metric above a minimum similarity metric threshold. Thus, the number of similarity metric calculations that need to be undertaken can be drastically reduced by establishing and applying the minimum similarity metric threshold by the optimization module 150.

Another optimization technique that may be employed by the optimization module 150 may be to establish a minimum similarity metric threshold as a parameter used to remove feature-to-string mappings from the index after the index has been created. For example, the number of features that must be mapped in order to guarantee that there will be no target string candidates missed for a given minimum similarity metric threshold may be established. Once the calculated value associated with the minimum similarity metric threshold is known, it may be used to remove feature-to-string mappings from the index. Again, while an exemplary approach for removal of feature-to-string mappings from the index is in detail below, it will be understood that this approach may be applied to a wide variety of different kinds of features, feature weighing schemes, and similarity metrics that may be employed as alternatives to the specific techniques outlined below.

Equation Error! Reference soure not found. 5 is repeated here for convenience and will be referred to below as Equation 9:

$$y < \frac{c}{w*A + (1-w)*B} \qquad \text{Equation 9}$$

Where y=sim($t_1$,$t_2$), C=I(common($t_1$,$t_2$)), A=I(F($t_1$)), and B=I (F($t_2$)). Again, $t_1$ represents a source string and $t_2$ is a target string instance which is found in the index. As stated above, the target strings as represented in the index containing mappings between features and strings may be examined to determine which target features are not to be mapped in the index for a given minimum score threshold and target string weight (e.g., as established by the feature weighting module 120. In this regard, feature-to-string mappings may be removed from the index such that corresponding target strings having only features that have been removed from the index may not be returned as candidate target strings for which a similarity metric is calculated. In this approach, the minimum value of x in Equation 10 is calculated in order to guarantee that Equation 9 will remain true.

$$x = \frac{c}{(1-w)*B} \qquad \text{Equation 10}$$

The ratio of Equation 10 represents the notion of the minimum value of the value x that can be provided given A will vary for different source strings that may be received. If the minimum value of x can be calculated such that Equation 9 remains true, then the minimum value of C may be determined because B can be calculated for each target string in the index prior to receipt of any source string. Thus, if the minimum value of C is known, then features from the index may be eliminated corresponding to target features that do not exceed the minimum value of C.

The worst possible value for A occurs when A=C (i.e. when A maximally constrains the ability to remove features from consideration). This means that A will contribute the maximum it can to the similarity score. Using this substitution and substituting B with its value given in Equation 10 (solving for B) Equation 9 becomes:

$$y < \frac{c}{w*c + \frac{c}{x}} \qquad \text{Equation 11}$$

Now x can be solved for in terms of y which results in:

$$x > \frac{y}{1-y*w} \qquad \text{Equation 12}$$

Equation 12 may now be used for determining minimum required value of C such that y has any chance of being greater than the provided minimum similarity metric threshold. Given the calculated minimum value of C, features of the target strings ($t_2$) that can be eliminated from the index can be identified. One strategy is to sort the features of $t_2$ in order of descending frequency. The information of the features in that order may be summed such that the sum does not exceed the value of C that was calculated. Accordingly, the remaining (and more informative) features are left in the index for consideration in the calculation of similarity metrics between an identified source string and the target strings based on the pruned index where features have been removed as per the foregoing. To generalize the operation of this optimization, the smaller the value of w (the weight parameter for the source string) the more target features can be removed the index. Similarly, the larger the value of y, the more features can be pruned from the index.

Returning to FIG. 2, the string analysis tool embodiment 100 may include a user interface 160. The user interface 160 may include display and/or input features through which a user may interact with the string analysis tool 100. In this regard, various elements of the foregoing description may be controllable by a user via interaction with the user interface 160. For example, identification and/or receipt of a source string may be provided by a user via the user interface 160. Furthermore, predetermined values such as the minimum similarity metric threshold may be input by the user via the user interface 160. Furthermore, the string similarity output may be displayed to the user via the user interface 160.

In this regard, the foregoing string analysis tool including the optimization techniques described above may be used to perform string analysis at run time in an efficient and rapid manner. In this regard, the foregoing approach may leverages benefits of both deterministic-type and fuzzy logic-type analysis in that deterministic-type decisions may be made to eliminate features from consideration in the analysis, while fuzzy logic-type analysis that is domain and context independent may also be carried out to provide similarity metrics between source and target strings. As such, the foregoing string analysis may be used in a number of contexts where similarity analysis of strings may be useful.

Figure 3:
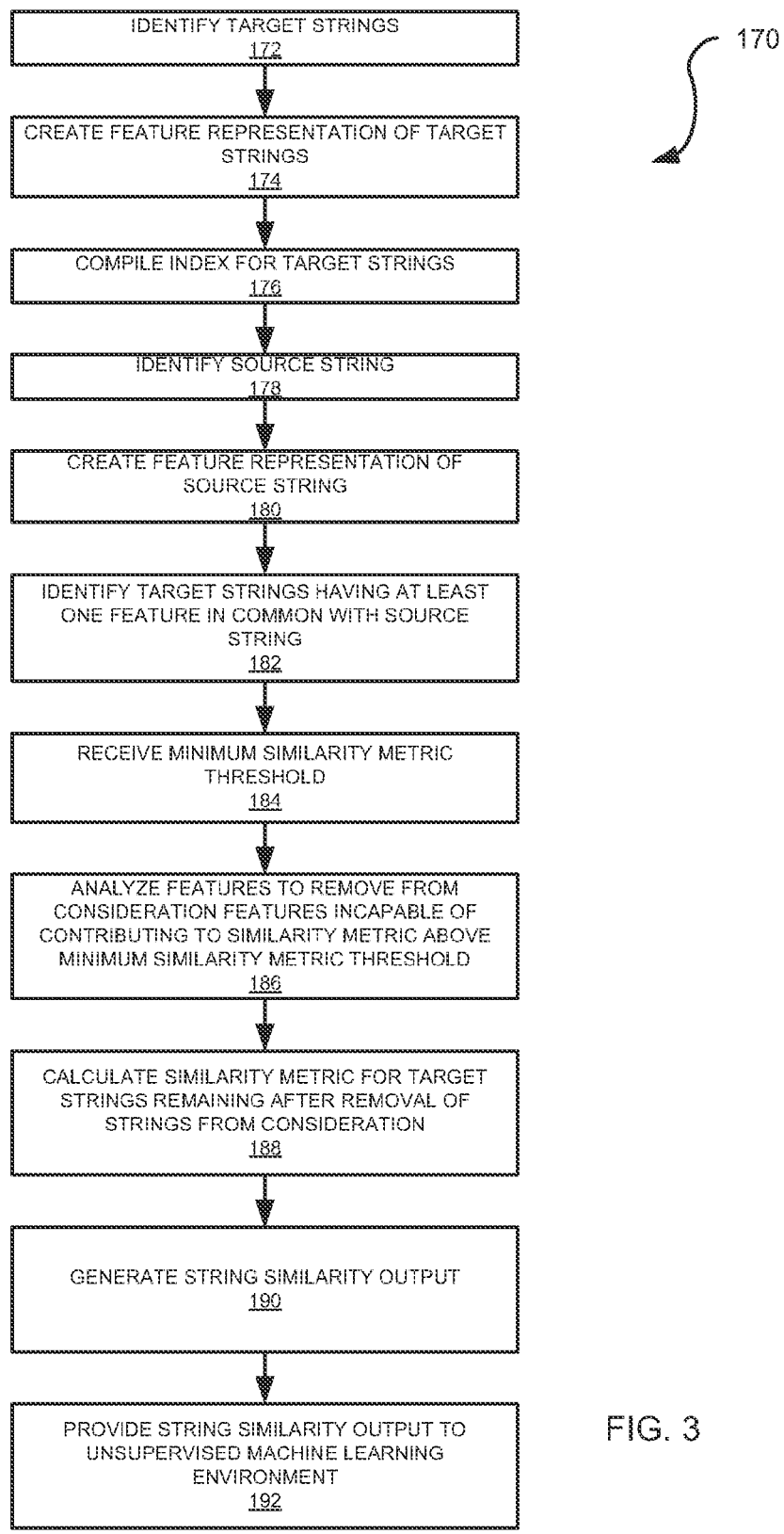
FIG. 3 depicts a flow chart of an embodiment of a string analysis process.

One embodiment of an exemplary string analysis method 170 is depicted in FIG. 3. The method 170 may include identification 172 of a plurality of target strings. As described above, the target strings may correspond with a plurality of different data types and/or data sources. The method 170 may also include creating 174 a feature representation of the target strings (e.g., as described above with respect to feature module 110). The method 170 may also include compiling 176 an index for the target strings. Again, the index may include mappings between target features and target strings including each target feature as described above with respect to the indexing module 130.

The method 170 may also include identifying 178 a source string. As described above, the source string may correspond to a search query, a portion of data desired to be analyzed in view of the target strings, or even a target string analyzed in view of others of the target strings. The method 170 may include creating 180 a feature representation for the source string. The features representing the source string may be similar to or different than the features of the target string. In any regard, the method 170 may include identifying 182 target strings having at least one feature in common with the source string. As such, in a similar manner as that described above with respect to the optimization module 140, only those target strings mapped to features present in the source string as determined with reference to the pre-compiled index may be returned.

In a further portion of the method 170, a minimum similarity metric threshold may be received 184. The minimum similarity metric threshold may correspond to a minimum value for the similarity metric to be calculated for target strings relative to the source string. That is, the minimum similarity metric threshold may be a value such that target strings having a value below the minimum similarity metric threshold may not even have a similarity metric calculated. As such, the method 170 may include analyzing 186 feature (e.g., of either the source string or target string) that may be removed from consideration because the features are incapable of contributing to a similarity metric above the minimum similarity metric threshold. For example, the above described processes or other processes utilizing other similarity metrics may be used in the analysis to determine which features are incapable of returning a similarity metric above the minimum similarity metric threshold. As such, the method 170 may include calculating 188 similarity metrics relative to the source string only for those target strings that based on the analysis 186 have similarity metrics exceeding the minimum similarity metric threshold.

Furthermore, as will be described in greater detail below, the method 170 may include generating 190 a string similarity output. The string similarity output may be the similarity values for each target string that were calculated 188, one or more matched target strings, a target string cluster, or other data related to the calculated 188 similarity metrics. In this regard, the method 170 may, as will also be described in greater detail below, include providing 192 the string similarity output to an unsupervised machine learning environment or tool.

One context where such string analysis may be useful is in the context of a search. In this regard, a search query may be received as a source string. A searchable corpus of may correspond to the target strings. In this regard, the target strings of the searchable corpus may be represented as features in the manner described above. Furthermore, an index inducing feature-to-string matching may be created. For example, the index may be compiled prior to receiving the search query.

In this regard, the foregoing string matching analysis may be performed using the index in conjunction with one or more optimization techniques to return search results in far less time that would be required in traditional searching methods. For example, in previous fuzzy logic approaches, a similarity metric may be required to be calculated for each target string with respect to the source string. However, utilizing the foregoing string analysis, selected features from the query and/or target features mapped in the index may be eliminated from consideration in the analysis. Thus, far less similarity metrics may be required to be calculated when returning search results from the target strings (the searchable corpus) based on the source string (the search query. In this regard, in the context of the search, a number target strings may be returned as results in the search. For example, a predetermined top number of search results, results with a similarity metric above some threshold value, or an ordered list of results (e.g., arranged by descending similarity metrics) may be returned in response to the search query.

In another embodiment, the foregoing string analysis may be used in the context of matching a source string to a target string. In this regard, like in the context of a search, after the source string and target strings have been represented as features and an index of feature-to-string mappings has been complied, selected source features and/or target features may be identified for elimination from consideration when calculating a similarity metric such that a similarity metric need not be calculated for each target string and the source string. Accordingly, one or more matched target strings may be returned as matches to the source string. For example, target strings having a similarity metric above a certain threshold value may be designated as matches. Alternatively, the target string having the highest similarity metric may be returned as the match for a source string.

In still another embodiment, the foregoing string analysis may be used to return grouped or clustered strings from the target strings that are highly similar. For example, as described above, a plurality of target strings may be stored or received as target content 20. Each of the target strings may be represented as features. An index including a feature-to-string mapping may be compiled for the target strings.

Additionally, each one of the target strings may have a similarity metric calculated in accord with the foregoing with respect to others of the target strings. That is, each target string may be used as a source string in a string analysis as described above. In this regard, each string from the target strings may have a similarity metric calculated with respect to other strings in the target strings. This process may include the optimization techniques described above such that a similarity metric for any given target string may only be calculated with a portion of the other target strings based on the removal of features from consideration based on a minimum similarity metric threshold.

Once the similarity metrics have been calculated for the target strings, related target strings (i.e., strings with relatively similarity metrics with respect to one another) may be clustered. The clustering of stings may include clustering all strings from the target strings that exceed a predetermined threshold value with respect to one another. Any method may be used to cluster target strings based on the similarity metrics provided. One such example of a target string cluster 200 is shown in FIG. 4.

It may be appreciated that the string analysis tool embodiments may also be conjunction with an unsupervised learning environment (e.g., in the context of big data environments). In this regard, the string analysis tool may be used in the course of unsupervised machine learning (e.g., to determine matches between a source string and target string) or the string analysis tool may be used to "clean" data (e.g., order data into clusters) prior to the unsupervised machine learning being applied to the data. Accordingly, the string analysis may be used alone or in conjunction with other techniques in an unsupervised learning process (e.g., to "learn" hidden structures from a corpus of data for which little or nothing is known, to determine matches between a source form and a target form, etc.).

In this regard, the string analysis may provide a string similarity output corresponding to one or more of a match, a plurality of search results, or string clusters as described above. The string similarity output may then be provided to an unsupervised learning environment. The unsupervised learning environment may include a plurality of machine learning tools for performing techniques that may leverage the string analysis tool or utilize a string similarity output as inputs into the unsupervised learning environment. For example, the machine learning techniques may discern meaning from the data, organize the data (e.g., into hierarchical classes), create or apply rules regarding the data, or other machine learning techniques.

For example, one particular context in which the foregoing techniques may be employed is in the field of legacy database operations. That is, many organizations have information stored in a variety of legacy databases, for example, product databases containing product listings and attributes. It may be appreciated that legacy databases may have been developed or populated by different entities or otherwise include different conventions relating to linguistics and syntax. As may be appreciated in the following, the string analysis described herein may be leveraged in various machine learning techniques. Examples of machine learning techniques that may be used in conjunction with the string analysis tool described herein include various techniques described in U.S. Pat. No. 7,865,358, U.S. Pat. No. 7,536,634, U.S. Patent Publication No. 2009/0281732, and 2011/0093467, each of which is commonly owned with the current assignee and each of which is incorporated by reference herein.

In an embodiment, the unsupervised learning environment may apply one or more external knowledge source to the string similarity output. For example, the external knowledge source may include a dictionary, a term glossary, grammatical rules, a known syntax, a schema (e.g., public or private), frame-slot architecture, or some other external source of knowledge. For instance, matching techniques may be used to determine applicability of the external knowledge source to all or a portion of the string similarity output.

For example, as described in the above references incorporated herein, in some instances, a semantic metadata model may be developed to facilitate data transformation. The semantic metadata model may utilize contextual information and standardized rules and terminology to improve transformation accuracy between a source form and a target form. In this regard, the semantic metadata model may employ a taxonomy defining relationships between terms or items. Oftentimes the taxonomy for a semantic metadata model must be tediously created by a subject matter expert with knowledge of the context of the data.

Figure 5:
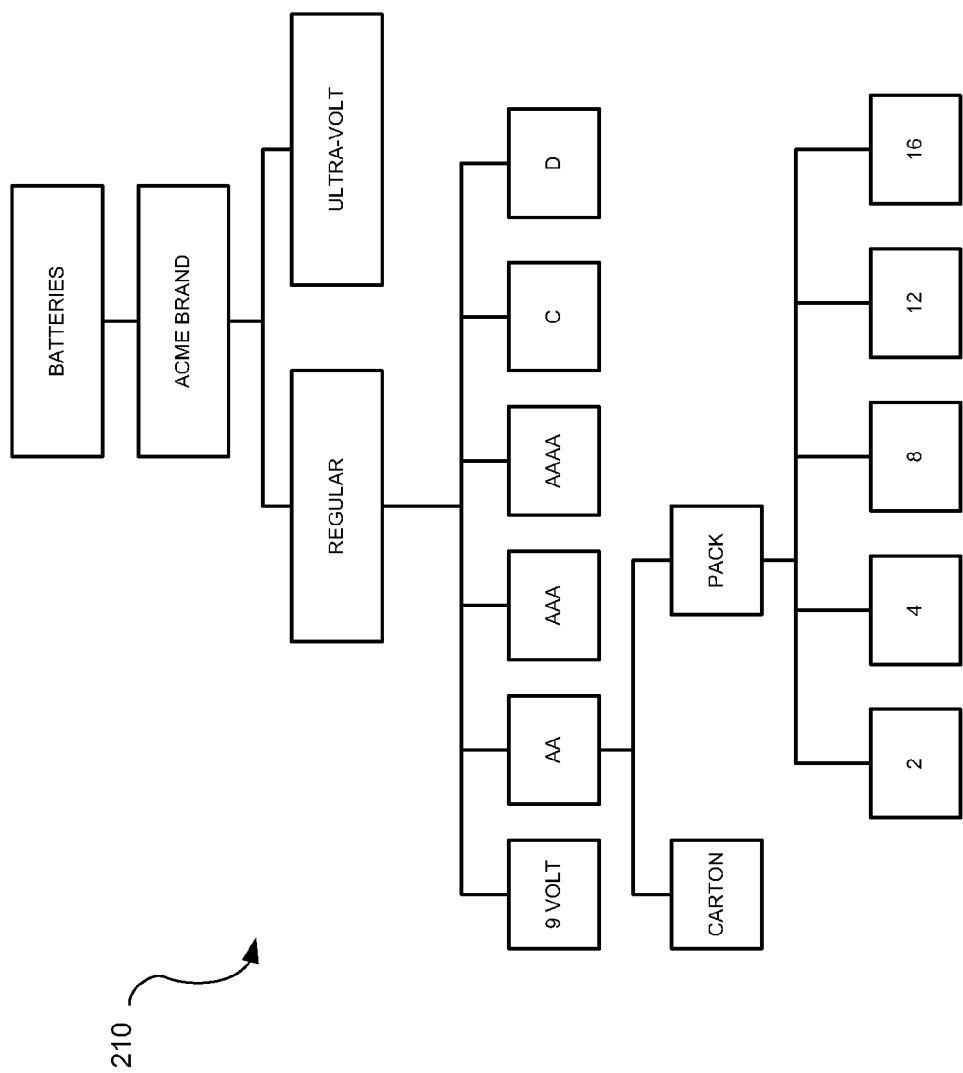
FIG. 5 depicts a portion of a taxonomy that may be derived by an unsupervised learning environment based on the string cluster of FIG. 4

In contrast, it is contemplated that, in one embodiment described herein, the string analysis tool 100 described herein may be employed to provide an input capable of undergoing unsupervised machine learning. For example, the cluster 200 shown in FIG. 4 may be generated from a plurality of text strings regarding a product database using the string analysis tool 100 as described above. The cluster 200 may be provided to an unsupervised machine learning environment. In this regard, the machine learning environment may be operative to derive a taxonomy 210 from the cluster as shown in FIG. 5. The taxonomy 210 shown in FIG. 5 may comprise a portion of a larger taxonomy derived from the cluster with some portions not shown for clarity. As may be appreciated, given the cluster 200 includes a plurality of strings that are similar in nature, many of the subclasses appearing in the taxonomy 210 may be derived from an analysis of the cluster 200. For example, it may be recognized using the unsupervised machine learning that each string in the cluster 200 corresponds to a product list for batteries as "BATTERIES" appears in each of the related strings. Further subclasses may be derived recognizing features common to smaller subsets of the clustered strings. For example, it may be determined that a number of the strings deal with a type of battery, "ULTRA-VOLT" based on the appearance of this feature or a similar feature in the string. As such, a class for Ultra-Volt products may be generated. Strings lacking this feature or a similar feature may be attributed to a "REGULAR" subclass in the taxonomy 210. The creation of the taxonomy of the cluster 200 may be further developed by recognizing the presence of features in the strings related to, for example, battery voltages, package types, and number of batteries per pack as shown in the taxonomy 210.

Of particular interest is the fact that this taxonomy 210 may be derived from the cluster 200 without any contextual knowledge regarding batteries or battery packaging. That is, the parsed structure of the strings belonging to the cluster 200 may provide the unsupervised machine learning sufficient context to develop the taxonomy without the intervention of a subject matter expert. In this regard, the taxonomy may be applied to a plurality of clusters to develop separate or integrated taxonomies that describe the larger corpus of target strings from which the cluster 200 was derived.

Furthermore, upon generation of additional taxonomies with respect to other clusters, the unsupervised machine learning environment may leverage the matching techniques of the string analysis tool 100 to match developed classes or subclasses with other cluster taxonomies to integrated separate taxonomies created based on individual clusters.

Other ways of utilizing the string analysis tool embodiment 100 in an unsupervised machine learning environment may also be provided. For example, matching strings to known dictionary entries for a term may be accomplished by the machine learning environment by using the string analysis tool 100. For example, particular target strings may contain many instances of the string "PRNTD CRCT BRD," and a dictionary employed by the machine learning environment may contain the entry "PRINTED CIRCUIT BOARD." However, because the machine learning environment may not recognize that "PRNTD CRCT BRD" is a form of "PRINTED CIRCUIT BOARD" (even though this may be apparent to a human), the machine learning environment may fail to recognize the relationship between the strings.

However, the string analysis tool embodiment 100 may be employed to match "PRNTD CRCT BRD" to "PRINTED CIRCUIT BOARD" such that the machine learning environment may recognize the two as being related or the same. In this regard, the machine learning tool may set each entry in the dictionary as source strings for input into the string analysis tool 100. Upon execution of the string analysis tool 100, the similarity metric between source strings corresponding to entries in the dictionary of the machine learning tool 100 and target strings may be used to identify related or corresponding forms, even absent one to one identity between the strings.

Further uses of the string analyses tool embodiment 100 to generate inputs into a machine learning environment or for use in a machine learning environment are contemplated. For example, the string analysis tool 100 may be used in correlating or interpreting an external input (such as a search query) in relation to one or more defined collections of information; correlating or interpreting an external input in relation to one or more external documents, files, or other sources of data; facilitating exchanges of information between systems; translating words, phrases or documents; generation or application of public or private schemas with respect to data that is otherwise incoherent or unorganized; recognition of contextual information; recognition of frame/slot architecture in data; generation of valid attributes and/or attribute values; or other machine learning functions that may be leveraged or facilitated by using matching, searching, or clustering as described above.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method of string analysis using a computer-based comparison tool, comprising:
    identifying, using the computer-based comparison tool, a plurality of target strings;
    representing each of the plurality of target strings as one or more target features;
    compiling, using the computer-based comparison tool, an index corresponding to the target features, wherein the index comprises a mapping for each target feature to each of the plurality of target strings containing the target feature;
    receiving, using the computer-based comparison tool, a source string;
    representing the source string as a plurality of source features;
    determining a portion of the target strings for which a similarity metric is to be calculated at least partially based on the index, wherein the portion of the target strings comprises less than the entirety of the target strings; and
    calculating, using the computer-based comparison tool, a similarity metric for the source string relative to only the portion of the plurality of target strings, wherein the similarity metric is at least partially based on commonality between the target features and the source features.

2. A method according to claim 1, wherein the portion of the plurality of target strings for which a similarity metric is calculated at least comprise one target feature in common with at least one source feature.

3. A method according to claim 2, further comprising:
    assigning a feature weight to each feature, wherein the feature weight of the feature corresponds to a measure of the contribution of the feature to the similarity metric, and wherein the source features are assigned a source feature weight and the target features are assigned a target feature weight, and wherein the source feature weight is different than the target feature weight.

4. A method according to claim 3, wherein the feature weight is at least partially based on a frequency of the feature in the plurality of target strings, wherein a feature having a frequency above an upper threshold or a frequency below a lower threshold is given a reduced frequency weight.

5. A method according to claim 4, further comprising:
    establishing a minimum similarity metric between the source string and the target strings; and
    eliminating source features from consideration in the determining prior to the calculating at least partially based on the minimum similarity metric.

6. A method according to claim 5, wherein the eliminating operation includes determining a portion of the source features that must be employed in the calculating such that only target strings having common target features to the portion of the source features are capable of exceeding the minimum similarity metric and are included in the portion of target strings for which a similarity metric is calculated.

7. A method according to claim 4, further comprising:
    establishing a minimum similarity metric between the source string and the target strings;
    removing at least one mapping from the index at least partially based on the minimum similarity metric.

8. A method according to claim 7, wherein the removing operation includes determining a portion of the target features that can be removed from the index such that only target features are included in the index that correspond with target strings capable of exceeding the minimum similarity metric.

9. A method according to claim 1, further comprising:
    generating string similarity output data at least partially based on the similarity metric.

10. A method according to claim 9, wherein the string similarity output data comprises matching ones of the portion of the plurality of target strings, wherein the matching ones correspond to a similarity metric above a predetermined threshold with respect to the source string.

11. A method according to claim 10, wherein the string similarity output data comprises a matched target string from the plurality of target strings based on the matched string having the highest similarity metric relative to the source string.

12. A method according to claim 11, wherein the output data comprises at least one cluster of strings, wherein the at least one cluster of strings comprises a plurality of target strings identified as exceeding a threshold similarity metric with respect to each other.

13. A method according to claim 9, wherein the string similarity output is provided to an unsupervised learning environment, and wherein the unsupervised learning environment employs the string similarity output in an automated machine learning process.

14. A method according to claim 13, wherein at least one external knowledge source is employed by the unsupervised learning environment with respect to the string similarity output.

15. A method according to claim 9, wherein the method is employed by an unsupervised learning environment in application of at least one machine learning technique to a data set.

16. The method of claim 1, wherein the one or more target features and the plurality of source features are domain independent.

17. An apparatus for use in string analysis, comprising:
- a feature module, executable by a processor of the computer-based string analysis tool, operable to represent each of a plurality of target strings as a plurality of features;
- an indexing module, executable by a processor of the computer-based string analysis tool, operable to compile an index comprising a mapping, wherein the mapping correlates each target feature to each one of the plurality of target strings containing the target feature;
- a similarity metric module, executable by a processor of the computer-based string analysis tool, operable to calculate a similarity metric between a source string and each of a selected portion of the plurality of target strings having at least one common feature to the source string, wherein the similarity metric comprises a quantitative value regarding the commonality of features between the source string and each of the selected portion of the plurality of target strings; and
- an optimization module, executable by a processor of the computer-based string analysis tool, operable to determine the selected portion of the plurality of target strings for which a similarity metric is calculated based at least partially on elimination of features from consideration based on a minimum similarity threshold.

18. An apparatus according to claim 17, further comprising a feature weighting module, executable by a computer-based string analysis tool, that is operable to attribute a weight to a feature for use in calculating the similarity metric.

19. An apparatus according to claim 18, wherein the optimization module is operable to eliminate features from consideration such that the selected portion of the plurality of target strings only include target strings having a similarity value relative to the source string above the minimum similarity metric threshold.

20. An apparatus according to claim 19, wherein the eliminated features comprise at least one source feature and at least one target feature.

21. An apparatus according to claim 20, further comprising an unsupervised machine learning tool in operative communication with the apparatus for use in string analysis, wherein the unsupervised machine learning tool is operable to utilize the apparatus in performing at least one unsupervised machine learning operation.

22. An apparatus according to claim 21, wherein the unsupervised machine learning tool is operable to utilize the apparatus for at least one of generating an string similarity output receivable by the unsupervised machine learning tool or access the apparatus during the at least one unsupervised machine learning operation.

23. A non-transitory storage medium for storing instructions for execution by a processor of a computer-based string analysis tool, wherein the instructions, when executed by the processor, cause the processor to:
- identify a plurality of target strings; represent each of the plurality of target strings as one or more target features;
- compile an index corresponding to the target features, wherein the index comprises a mapping for each target feature to each of the plurality of target strings containing the target feature;
- receive a source string;
- represent the source string as a plurality of source features;
- determine a portion of the target strings for which a similarity metric is to be calculated at least partially based on the index, wherein the portion of the target strings comprises less than the entirety of the target strings; and
- calculate, using the computer-based comparison tool, a similarity metric for the source string relative to only the portion of the plurality of target strings, wherein the similarity metric is at least partially based on commonality between the target features and the source features.

* * * * *